2,768,910

PROCESS OF IMPREGNATING WOOD

Hans Krzikalla, Heidelberg, and Oskar Lissner, Mannheim, Germany, assignors to Badische Anilin- & Soda-Fabrik Aktiengesellschaft, Ludwigshafen (Rhine), Germany No Drawing. Application March 26, 1952, Serial No. 278,752

Claims priority, application Germany March 29, 1951

8 Claims. (Cl. 117—149)

The present invention relates to improved wood and a process of producing same.

It is already known that wood can be improved, i. e. in particular improved as regards hardness, compressive strength, hygroscopicity and liability to swell, by impregnation with hardenable condensation products on the basis of phenol or urea or their derivatives with formaldehyde. After impregnation with these condensation products, the wood must be dried at high temperatures in order to produce a hardening and water-insolubility of the condensation products. The wood treated in this way is certainly hard at the end of this condensation process, but less elastic so that it frequently does not sufficiently satisfy the necessary requirements as to flexibility. It is often necessary to add acids or acid-reacting substances in order to accelerate the hardening of the impregnating solutions. The acid impregnating solutions have accordingly only a limited stability in storage. By the increase in the size of the molecule which takes place during the progressive condensation of the resin, the speed and depth of pentration into the wood is reduced and finally the impregnating solutions become turbid, form water-insoluble precipitates and can no longer be used in practice for the impregnation of wood.

We have now found that these difficulties are overcome when wood is impregnated with aqueous, and preferably ammoniacal, solutions of polycarboxylic acids containing at least 6 carbon atoms in the molecule. The hardness and compressive strength and the resistance to swelling of the wood are thus increased, its hygroscopicity reduced and its bending strength considerably improved. The stability of the alkaline-aqueous impregnating solutions in storage is practically unlimited.

Good results are already obtained with phthalic acid, adipic acid, sebacic acid and their higher molecular homologues. It is, however, especially advantageous to use resinous polycarboxylic acids which can be prepared for example from acid natural resins, such as colophony or the unsaturated acids contained therein by adding on unsaturated carboxylic acids, such as acrylic acid, maleic acid and the like. Contrasted with pure colophony (abietic acid), these polycarboxylic acids obtained therefrom have the advantage that they are readily soluble even in diluted weak bases and that they are firmly bound by the wood when used for its impregnation.

For the preparation of the impregnating solution it is preferable to dissolve the carboxylic acids in dilute ammonia because upon drying the impregnated wood the ammonia escapes again and the polycarboxylic acids remaining in the wood give a waterproof impregnation. After the wood has been dried, they cannot, in contrast to pure colophony, be lixiviated out and impart to the wood an increased stability to weathering and a durable resistance to swelling.

The polycarboxylic acids may be used together with other impregnating agents, as for example the known condensation products from phenol or urea and formaldehyde. The impregnating solutions to be used according to this invention may also contain additions of dyestuffs, fungicidal and bactericidal substances, such as water soluble fluorides, phenols, zinc salts, arsenic and chromium compounds as well as mixtures of these substances and substances which reduce the combustibility of wood. In this way the wood may be coloured and improved as regards elasticity, hardness, stability to weathering and in particular moisture and also in respect of its combustibility all in one operation. The impregnated wood may, if desired, be compressed whereby the hardness and resistance to swelling are still further increased. The wood thus improved has special importance in architecture, carriage building, the furniture industry and generally for purposes where it is desired to employ wood which is hard and elastic at the same time, as for example for the production of staves in the production of barrels.

The following examples will further illustrate this invention but the invention is not limited to these examples.

Example 1

Spruce wood boards are impregnated with an aqueous ammoniacal solution (pH=7) of a resinous adduct from colophony and acrylic acid which has a softening point of about 125° C. and an acid number of 238 (solids content of the solution=20%). The impregnation is carried out for 4 hours in vacuo (10 torr) until air bubbles no longer escape. Then a pressure of 3 atmospheres is applied. The impregnated wood is dried at 105° C. until its weight is constant. The properties are determined in comparison with those of untreated spruce wood (from the same piece of wood) and with those of boards which have been treated in a corresponding manner with a 20% solution of colophony (softening point about 60° C.; acid number 158) in a mixture of xylene and benzene. Whereas in the case of the wood impregnated with colophony with a resin absorption of 48% the increase in the values for the hardness and bending strength is 20% and 5% respectively, and 35% of the constituents of the impregnated wood are lixiviated out by immersion in running water for 3 days (the non-impregnated wood containing only 2.5% of constituents capable of being lixiviated out), in the case of the boards treated with the colophony-acrylic acid resin with a resin absorption of only 23% the increase in values for hardness and bending strength is 48% and 15%, respectively. The tendency to swell is reduced by 45% and only 2.5% of the constituents of the wood could be lixiviated out.

Example 2

The impregnation of fir wood boards is carried out in a similar manner to Example 1 with a 20% aqueous ammoniacal solution of a colophony-maleic acid resin (softening point 113° C., acid number 270), the pH of the impregnating solution being 8. After thorough impregnation and drying at 105° C. to constant weight, the following changes in the properties of the wood were established:

|  | Percent |
|---|---|
| Increase in weight | 18–25 |
| Increase in compressive strength | 27–33 |
| Increase in hardness | 56–78 |
| Increase in bending strength | 12–28 |
| Decrease in hygroscopicity | 38–46 |
| Decrease in tendency to swell | 50–54 |
| Amount lixiviated out after lying for 3 days in running water | 2.5 |

The ammonium salt of the adduct of anthracene and maleic acid can be used in a similar way and gives similar results.

Example 3

Spruce wood boards are impregnated in the manner described in Example 1 with a 20% ammoniacal solution of phthalic acid and then dried for 3 days at 105° C. Compared with untreated wood, the treated wood has the following improved property values:

| | Percent |
|---|---|
| Increase in weight | 43 |
| Increase in compressive strength | 51 |
| Increase in hardness | 63 |
| Increase in bending strength | 21 |
| Decrease in hygroscopicity | 59 |
| Decrease in tendency to swell | 42 |

Similar results are obtained when using adipic acid or sebacic acid instead of phthalic acid.

What we claim is:

1. A process for improving wood which comprises impregnating the wood with an aqueous ammoniacal solution of an adduct of colophony and an aliphatic unsaturated carboxylic acid containing from three to four carbon atoms and drying the impregnated wood.

2. A process as claimed in claim 1 wherein an adduct of the acids contained in colophony and an aliphatic unsaturated carboxylic acid as defined in claim 1 is employed as the impregnant.

3. A process as claimed in claim 1 wherein an adduct of colophony and acrylic acid is employed as the impregnant.

4. A process as claimed in claim 1 wherein an adduct of colophony and maleic acid is employed as the impregnant.

5. A process for improving wood which comprises impregnating the wood with an aqueous ammoniacal solution of an adduct of colophony and an aliphatic unsaturated carboxylic acid containing from three to four carbon atoms and a pest repelling agent which does not react with the adduct.

6. A process as claimed in claim 5, wherein the adduct is an adduct of the acids contained in colophony and an aliphatic unsaturated carboxylic acid as defined in claim 5.

7. A process as claimed in claim 5, wherein the adduct is an adduct of colophony and acrylic acid.

8. A process as claimed in claim 5, wherein the adduct is an adduct of colophony and maleic acid.

References Cited in the file of this patent

UNITED STATES PATENTS

| 2,039,243 | Krzikalla | Apr. 28, 1936 |
| 2,182,081 | Hatfield | Dec. 5, 1939 |
| 2,423,619 | Roon | July 8, 1947 |
| 2,629,648 | Ericks | Feb. 24, 1953 |